United States Patent [19]

Wiesenewsky

[11] 3,925,764

[45] Dec. 9, 1975

[54] MEMORY DEVICE

[75] Inventor: Karl-Heinz Wiesenewsky, Berlin, Germany

[73] Assignee: Licentia Patent-Verwaltungs-G.m.b.H, Frankfurt am Main, Germany

[22] Filed: Oct. 16, 1974

[21] Appl. No.: 515,708

[30] Foreign Application Priority Data

Oct. 16, 1973 Germany ............ 2352324
Dec. 8, 1973 Germany ............ 2361680

[52] U.S. Cl. ............ 340/168 R; 340/147 P
[51] Int. Cl.$^2$ ............ H03K 21/00; H04Q 3/02
[58] Field of Search ......... 340/147 P, 167 R, 168 R, 340/152 R, 168 S; 235/92 SH

[56] References Cited

UNITED STATES PATENTS

| | | | |
|---|---|---|---|
| 3,359,541 | 12/1967 | Hunkins et al. | 340/152 R |
| 3,760,355 | 8/1973 | Bruckert | 340/149 R X |
| 3,840,752 | 10/1974 | Eshraghian | 340/147 P X |
| 3,876,982 | 4/1975 | Morrien | 340/147 P |
| 3,876,986 | 4/1975 | Mestoussis | 340/168 R |

OTHER PUBLICATIONS

IBM Technical Disclosure Bulletin Vol. 13, No. 10, Mar. 1971, pp. 3034–3036. "Selective Length Redundancy Coding Register" R. T. Chien et al.

*Primary Examiner*—Donald J. Yusko
*Attorney, Agent, or Firm*—Spencer & Kaye

[57] ABSTRACT

A memory device for automatic switching control systems using pulse patterns for the switching control. The working pulse pattern and the test pulse pattern are fed to the input of a shift register which has one more register stage than the number of clock pulses per pulse pattern. The clock pulse signal and an erase signal pattern, which is present as required are also fed to the shift register. A logic circuit arrangement is connected to the shift register to detect the presence of a working pulse pattern therein and to cause same to be stored in the shift register.

27 Claims, 12 Drawing Figures

MEMORY DEVICE

BACKGROUND OF THE INVENTION

The present invention relates to a memory device for any desired pulse image or pattern in automatic switching control systems.

Electrically remote controlled switches are known to be controlled by a method in which the signals to be transmitted comprise pulse images or patterns. A control with pulse images has the advantage that the control system can be constructed in a most simple manner and flaws in the individual components can be dependably detected. In control systems of such configuration no memory members are required since all signals to be processed are continuously available.

Conditions are different for automatic controls, such as program controls for switching systems, for example. Here various signals must be stored in any case. Electronic controls operating with pulse patterns are not suitable for such control systems because the pulse images cannot normally be stored.

SUMMARY OF THE INVENTION

It is therefore the object of the present invention to provide a memory device for any desired pulse images in automatic control systems so that pulse pattern control can be utilized in that portion of the control art where memory members or devices are required, i.e., for example, for program controls of switching systems. Moreover, it is an object, according to the present invention to be able to distinguish between pulse images or patterns which are to be stored and those which are not to be stored.

The above objects are accomplished according to the present invention in that a memory device is provided which involves a shift register SR, having one more register stage than the number of clock pulses per pulse pattern and which is charged at its input stage SR1 by a permanently present clock pulse pattern $J_T$, an erase pulse pattern $J_L$, which is present when required and, via first OR circuit 01, by a working pulse pattern $J_A$, $J_E$ or $J_R$ and a logic network including a timing member T which emits an output pulse for a predetermined period of time after an input pulse is supplied thereto, a plurality of AND circuits U2, U3, U5, U6, and a plurality of OR circuits O3, O4. The AND member U2 has its inputs connected with the output of the first register stage and the output of the OR circuit O3 whose inputs are in turn connected with the outputs of at least one further register stage. The output of AND circuit U2 is connected to the input of timing member T. AND circuit U3 has its inputs connected to the output of the timing member T and the output of the penultimate register stage respectively, and its output fed back to the input of OR circuit O1. AND circuit U5 has its inputs connected to a clock pulse pattern line 5 and to the output of the last register stage, and its output connected to an input of the OR circuit O4. AND circuit U6 has its inputs connected to the output of the timing member T and to a working pulse pattern line 6, and its output connected to another input of the OR circuit O4 whose output constitutes the output 11 of the memory device. If the control system is of the type which transmits an erase pulse after each pulse pattern, then the memory device is provided with certain additional logic linkage.

In the above arrangement the pulse patterns cannot be delayed. However, in some cases it is desirable to delay some of the pulse patterns or images so that with a switch-on delay the pulse patterns present at the input of the time or delay stage will appear in the correct phase at the output thereof only after the expiration of a certain period of time and with switch-off delays the pulse patterns at the output of the time or delay stage will disappear only a certain time after the disappearance of the pulse pattern at the input of the time or delay stage.

A further object of the invention is therefore to provide a memory device in which the pulse images can be delayed with respect to time.

This latter object is accomplished, according to the present invention, in that the pulse pattern to be delayed is fed into a shift register which contains one more register stage than the number of clock pulses per pulse pattern, logic or linking members are connected to the output of the shift register so that the presence of a certain type of pulse pattern at the input of the shift register will cause a setting or counting pulse to be fed to a series-connected counter and so that the presence of another type of pulse pattern at the input of the shift register will cause the counter to be erased, and logic or linking members are provided at the output of the counter that after the counter has counted a preset number of pulse patterns the delay is terminated.

Thus the problem of providing pulse patterns with a switch-on delay so as to have the delay end always at the end of a pulse pattern is solved according to the invention in that the pulse pattern to be delayed is fed into a shift register which operates as a series/parallel converter and at whose outputs one or a plurality of AND circuits are provided which emit a temporary time signal only if the pulse pattern to be delayed is completely present in the shift register and shifted in phase by one clock pulse with respect to the pulse patterns at the input. The output signal of the AND circuit, or when different types of pulse patterns are to be delayed, the outputs of a plurality of AND circuits, each of which responds to a different pulse pattern in the shift register, which outputs are combined in an OR circuit, are connected to the input of a binary counter. The outputs of this binary counter are logically connected together in such a manner that after *n* pulse patterns the input pulse pattern is present at the output of the time stage in the correct phase and beginning with the first clock pulse of the pulse pattern it remains there until the working input pulse pattern $J_R$, $J_E$ or $J_A$ disappears and the test pulse $J_P$ appears in its stead.

The problem of providing the pulse pattern with a switch-off delay such that the switch-off delay always ends with the end of a pulse pattern is solved according to the present invention in that the above-described memory device is connected ahead of the delay member. The outputs of the binary counter which are logically connected together according to the desired switch-off delay are connected with the erase input of the memory device in such a menner that after *n* pulse patterns the memory is erased at the end of the pulse pattern and the binary counter is likewise reset when the test pulse for the next-following first test signal pulse pattern appears.

DETAILED DESCRIPTION OF THE PREFERRED EMBODIMENTS

Figure 1:
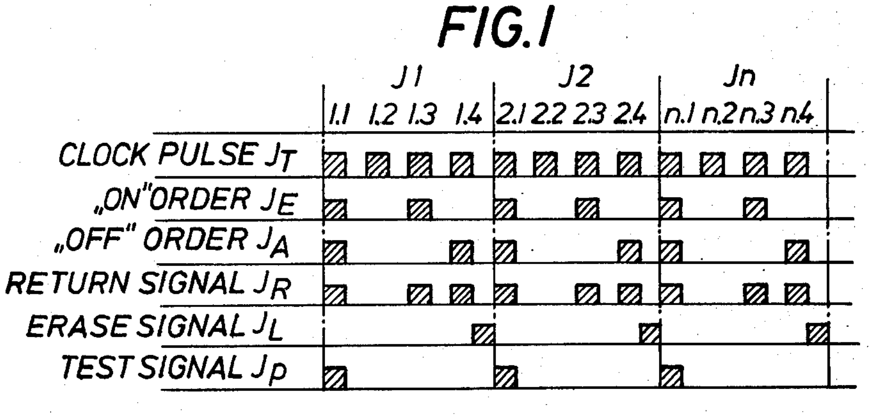
FIG. 1 shows simple pulse patterns which will be used to explain the invention.

Referring now to FIG. 1 there are shown the complete pulse patterns which are used for purposes of explanation and each of which includes four parts of clock pulse times 1.1, 1.2, 1.3 and 1.4. Intervals of defined duration are present between the parts of a pulse pattern where no signals are being transmitted. Only after the last part 1.4 of pattern $J_1$ during the interval until the beginning of the first part of the following pulse pattern $J_2$ is an erase signal $J_L$ transmitted over a special erase line. The subsequent pulse patterns $J_2$ and $J_n$ are constructed in the same manner as pulse pattern $J_1$. They are emitted in uninterrupted succession to correspond to the switching state. The array of identical or different pulse patterns in a line will hereinafter be called the pulse pattern train.

The first pulse pattern $J_T$ of FIG. 1 contains the clock pulse signals for controlling switching members (not shown) and the shift registers used in the memory device.

Figure 2:
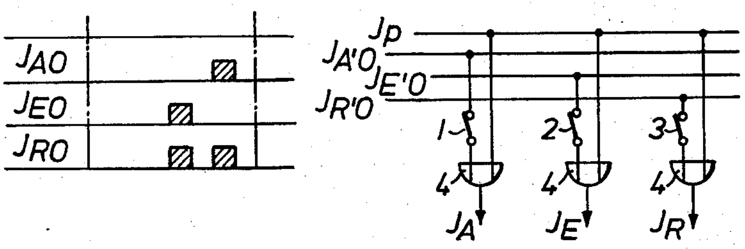
FIG. 2 illustrates the manner in which the working pulse patterns of FIG. 1 are formed from basic signals.

Pulse pattern $J_P$ furnishes the test signal for testing all devices of a control system operating with pulses. It is also used to test the memory device and is part of the type of pulse patterns which are not to be stored. Together with the basic pulse images $J_{AO}$; $J_{EO}$; and $J_{RO}$ (FIG. 2), it is used to form the pulse images $J_A$, $J_E$ and $J_R$ of FIG. 1.

In the interest of recognizing errors as rapidly as possible the absence of any test pulse is to be detected. This is the case only if in input signal switchings, which are often effected via contacts of cut-off relays, no signals are lost or disfigured. Since such switchings depend on particular events and cannot be synchronous with the clock pulse the switching from one type of pulse pattern to another is effected in the manner shown in FIG. 2. Under certain conditions which depend on the type of control system in which the pulse patterns are being used, it may be advisable to use the complete pulse patterns $J_A$, $J_E$ and $J_R$ instead of the basic pulse patterns $J_{AO}$, $J_{EO}$ and $J_{RO}$.

Through lines $J_{A,O}$, $J_{E,O}$ and $J_{R,O}$ the corresponding basic pulse images are brought to switching contacts 1, 2 and 3. Contact 1 serves to generate an "off" order, contact 2 generates an "on" order and contact 3 generates a return signal which can be used for processing "on" and "off" orders. Behind the respective contacts there is in each case an OR circuit 4 with two inputs, the second input of which is connected to a line $J_P$ through which the pulse pattern $J_P$ of FIG. 1 is continuously transmitted. Thus the test pulse is always available at the output of OR circuit 4 independent of the respective position of the contacts 1–3. When contact 1 is open, for example, the test pulse pattern $J_P$ is present at output $J_A$. When contact 1 is closed, the "off" pulse pattern of FIG. 1 is present at output $J_A$.

In a corresponding manner test pulse patterns $J_P$ at outputs $J_E$ and $J_R$ change to pulse patterns $J_E$ and $J_R$ of FIG. 1 when contacts 2 and 3, respectively, are closed.

In the selected embodiment, each pulse pattern begins with the test signal at clock pulse *n*.1. At clock pulse *n*.2 an 0 signal is present in all pulse patterns. A pulse pattern with an L signal only at this point would not be stored, as is the case for test pulse pattern $J_P$. Other, not storable pulse patterns are not possible in the selected pulse patterns of the example which has only four parts or clock pulse times since otherwise states would occur which are similar to the storable pulse patterns $J_E$, $J_A$ and $J_R$.

Figure 3:
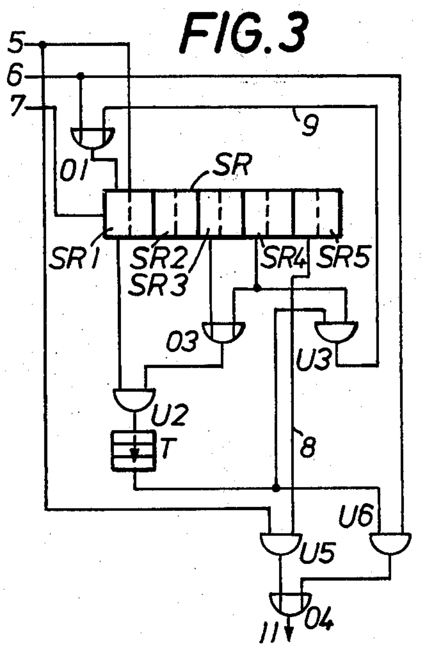
FIG. 3 is a logic circuit diagram of an embodiment of the invention using the pulse patterns of FIG. 1.

FIG. 3 shows the circuit of a memory device for pulse patterns shown in the example of FIG. 1 where the selected pulse patterns have four parts. This circuit will be used to explain the storage process. It should again be noted, however, that the pulse patterns of FIG. 1 are for purposes of explanation only and that other, particularly longer pulse patterns, can be stored in the same manner.

On a clock pulse line 5, the pulse pattern $J_T$ of the clock pulse pattern is continuously transmitted while on a signal line 6 a control (not shown) furnishes either the nonstorable pulse pattern $J_P$ or one of the storable pulse patterns $J_A$, $J_E$ or $J_R$ as the working pulse pattern. Erase line 7 carried the erase pulse pattern $J_L$ but only if the control (not shown) furnishes an order for erasing the memory device.

Signal line 6 is connected via an OR circuit O1 to the first register stage SR1 of a series-parallel shift register SR which here comprises register stages SR1 to SR5. For reasons of clarity, the shift register SR is shown only schematically. In principle, the shift register always includes one more register stage than the number of parts or clock pulses in the pulse patterns contain parts. In this way it is possible to store a complete pulse pattern in the shift register and, for purposes of storage, to return the signal shifted out of the penultimate register stage (SR4) back into the first register stage (SR1) without losing part of the content of the pulse pattern.

At the same time, the last register stage, in the selected example, register stage SR5, emits that signal through a line 8 during the first clock pulse of the $(n+1)$th pulse pattern train which was fed into register stage SR1 through line 6 during clock pulse $n-1$ of the $n^{th}$ pulse pattern train.

In order for the signal emitted from line 8 to be present at output 11 of OR circuit O4 in its original shape, it is linked in an AND circuit U5 with the clock pulses furnished through line 5.

Figure 5:
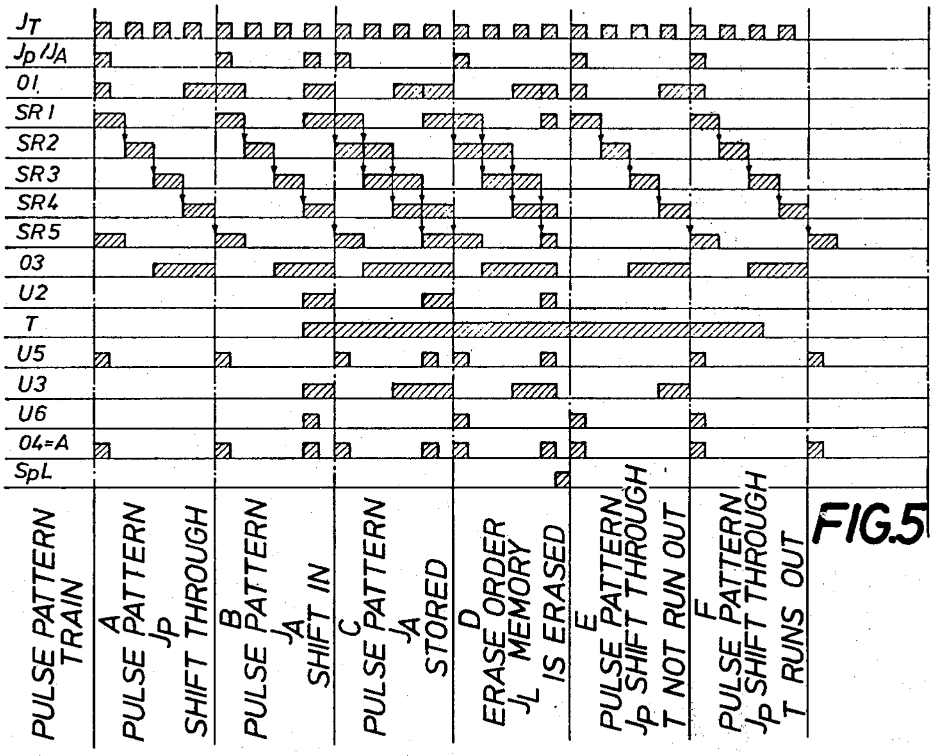
FIGS. 5 and 6 are time diagrams for various memory states and pulse patterns for the memory circiut of FIG. 3.

The procedure for shifting the nonstorable pulse pattern $J_P$ through the memory device is shown in FIG. 5 for pulse pattern train A which may be repeated as often as desired.

With pulse patterns of different configuration, it is always necesary only to have one more register stage than the pulse patterns contain parts of clock pulses.

If, for example, an "off" order, such as pulse pattern $J_A$ of FIG. 1, is to be stored, it will be necessary, as shown in FIG. 5 in the time diagram for pulse pattern train B, to shift pulse pattern $J_A$ into the memory device. For this purpose, the pulse pattern train $J_P$ in line 6 is replaced by the pulse pattern train $J_A$. It is assumed that in the operations now taking place the effect of the AND circuit U6 is initially not being considered.

Since now a pulse pattern which should be stored is shifted into the memory unit, the unit must be capable of recognizing that this is a pulse pattern to be stored. This is done in that, after a certain number of clock pulses, a signal pattern is contained in the shift register which is typical for pulse patterns which are to be stored. In the selected example, this is the case for pulse pattern $J_A$ after four clock pulses (pulse pattern train B in FIG. 5) and for pulse patterns $J_E$ and $J_R$ after three clock pulses (pulse pattern train B in FIG. 6), i.e. when the L signal of the respective first part of a storable pulse pattern has arrived in register stage SR3 or SR4, respectively, and the L signal of the third or fourth part, respectively, is present in register step SR1. This condition is detected in the circuit of FIG. 3 by the AND circuit $U_2$ whose one input is connected to the L output of SR1 and whose other input is connected via OR circuit O3 to the L outputs of SR3 and SR4. The output of AND circuit U2 is connected to the input of timing member T which produces an output signal for a predetermined time after the appliation of an input signal thereto. Switching of the time member T initiates the storage process.

The coupling of time member T via AND circuit U2 and OR circuit O3 to the individual register stages depends on the configuration of the pulse patterns to be stored. For differently designed AND/OR pulse patterns with more that four parts, the number of inputs of U2 and O3 may be different than in the selected example. It may also be possible for the linkage functions AND and OR to be exchanged or employed in other combinations.

After the first three parts of the pulse pattern have been shifted into shift register SR, the OR circuit O3 switches through and enables AND circuit U2. During the next clock pulse, the pulse pattern $J_A$ is completely present in the shift register. OR circuit O3 remains switched through because the L signal contained in register stage SR3 during the third clock pulse is now present in register stage SR4. Register stage SR1 now also contains the last L signal of the "off" pulse image so that AND circuit U2 now switches through and emits an L signal to time member T.

Time member T causes a switch-off delay. The delay period must be about 1.5 times the pulse pattern duration pulse $m$ times the pulsed pattern duration where $m$ indicates the number of repetitions of the erase pulse images $J_L$.

When an L signal arrives at the input of time member T, an output L signal is emitted at once so that AND circuit U3 also switches through since an L signal is also stored in register stage SR4.

Through a return line 9, the L signal of register stage SR4 is emitted as an enabling signal via OR circuit O1 to register stage SR1 and during the next clock pulse, the first part of the next pulse pattern train is shifted in again. The time sequence of shifting in pulse pattern $J_A$ is shown in FIG. 5 for pulse pattern train B. The reinsertion of the stored pulse pattern will be parallel with the renewed feeding in of the pulse pattern to be stored for several pulse pattern trains since this pulse pattern is ususally transmitted several times in a row. However, it is necessary only once for storage. After the pulse pattern $J_A$ to be stored has again been replaced in line 6 by test pulse pattern $J_P$, the repetition and renewed emission of the stored pulse pattern $J_A$ takes place as shown in FIG. 5 in pulse train C.

To erase the memory device, a control device (not shown) sends the erase pulse pattern $J_L$ through a line 7 to the shift register SR. Since this erase pulse is synchronous with the other pulse patterns and becomes effective at the end of a pulse pattern (see FIG. 1), the memory device and in particular the shift register is always erased at the end of a pulse image. The time sequences which then take place are shown in pulse pattern train D in FIG. 5.

During the next pulse pattern (pulse pattern train E in FIG. 5), AND circuit U2 no longer switches through so that time member T will not be excited again and now runs down completely.

Without consideration of AND circuit U6, no test pulse is emitted during the next pulse train after the erase pulse pattern $J_1$ has disappeared at output 11, because only the test pulse which has been shifted into the register after the erase pulse at the beginning of the next pulse pattern $J_P$ can be transferred from register stage SR5 to output 11 via AND circuit U5 and OR circuit O4 at the beginning of the next but one pulse pattern.

This has the result that during all pulse pattern trains in which an erase signal is fed in view line 7, no signal is emitted at output 11 as long as the effect of the AND circuit U6 is neglected. The memory device thus has a dominant erase behavior. A stored pulse pattern will furthermore be emitted only at a delay of one pulse pattern. The evaluation of the test pulses must thus consider the duration of the emission of the erase pulses. The significant advantage of the pulse pattern control, that the orderly operation of the entire control system can be tested during each pulse pattern, would be reduced by the storage device because the duration of the erase pulse train may be dependent on certain events. Furthermore, it may be a drawback if the memory device produces a delay in the pulse image transmission.

These drawbacks are avoided if the memory device is designed for dominant storage which is accomplished by the addition of the AND circuit U6.

In the "empty" state of the memory device (pulse pattern train A in FIGS. 5 and 6) only the nonstorable test pulse pattern train $J_P$ is shifted through which constitutes monitoring of the memory device because every error in the memory device leads to a falsification of the output pulse pattern train. After the memory device has recognized that a pulse pattern is present which is to be stored and time member T has switched through, AND circuit U6 which is connected in parallel with the shift register is enabled for switching through the signal input pulses on line 6. Since the switching through of time member T is effected at the first opportunity in order to detect a pulse pattern which is to be stored, all pulses of the pulse pattern are made available at output 11, via AND circuit U6 and OR member 04, simultaneously with their being shifted into the shift register. This assures that the pulse pattern to be stored is emitted at output 11 without delay (see FIG. 5, pulse pattern train B).

As long as a pulse pattern is stored and a test pulse pattern is being fed in through line 6, a signal is furnished during the first clock pulse of each pulse train via AND circuits U5 and U6 to the output 11 (pulse pattern train C in FIG. 5). During the erase process (pulse pattern train D in FIG. 5), during which any desired number of erase pulse patterns $J_L$ can be transmitted, the test signal is transferred, from line 6 via AND circuit U6 and OR circuit 04, directly to the output 11 even if the shift register is being erased continuously, so that the uninterrupted monitoring is re-established (pulse pattern train E in FIG. 5). At the moment when the delay period of time member T has run down, the AND circuit U6 is blocked again (pulse pattern train F in FIG. 5). During the first clock pulse of the next pulse pattern train, the test pulse which was shifted into the shift register during the preceding pulse pattern train is then emitted at output 11.

Figure 6:
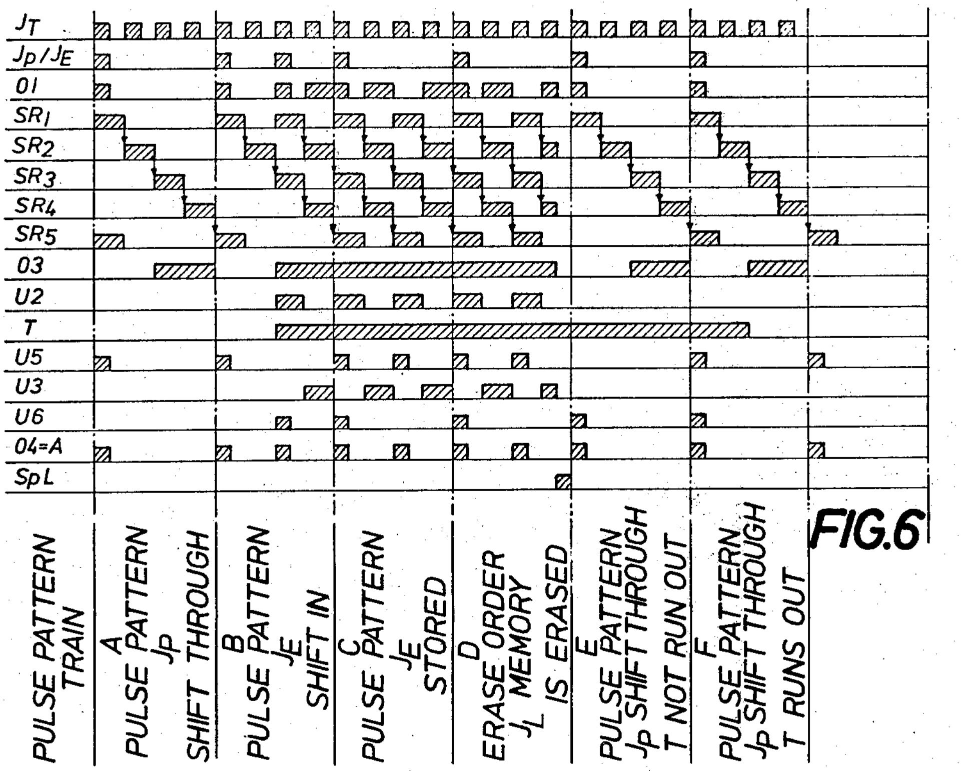

In the same manner as described for pulse image $J_A$, the pulse pattern $J_E$ can also be stored by the memory device of FIG. 3. The associated time diagram for the processes taking place for storage, repetition and erasure is shown in FIG. 6. Superimposing the time diagrams of FIGS. 5 and 6 results in the time diagram for pulse pattern $J_R$.

Under certain conditions which may be determined by the control system (not shown) an erase signal is transmitted after each completely transmitted pulse pattern so that the switching members at the output of the circuit are reset.

Figure 4:
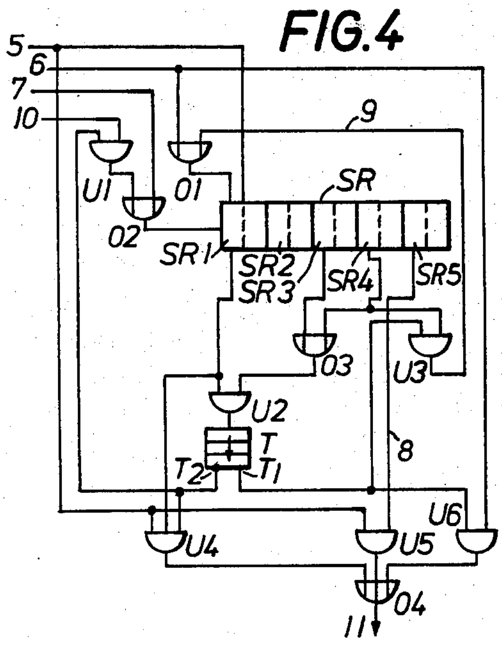
FIG. 4 is a modification of the embodiment of FIG. 3.

The memory device according to the invention for storing pulse patterns can also be used for these cases. The corresponding circuit, which in the example again operates with the pulse patterns of FIG. 1, is shown in FIG. 4. The same reference numerals as in FIG. 3 have the same meaning.

In contradistinction to the device of FIG. 3, in the device of FIG. 4, in addition to an erase signal which is present in line 7 when desired, an erase signal is also present in a line 10 at the end of each pulse pattern in line 6. The line 10 is connected to one input of AND circuit U1 whose other input is connected to a negated output T.2 of time member T and whose output is coupled via an OR circuit $O_2$ to the erase input of SR1. The erase signal on line 10 reaches the shift register SR only when the memory device is in its rest state, i.e. when time member T has not switched through and thus an L signal is present at the negated output T.2. In this case, the AND circuit U1 switches through with every erase pulse (see the time diagrams in FIGS. 7 and 8).

The test pulse image $J_P$ is switched through by an additional AND circuit U4. In order to accomplish this, the AND circuit U4 has three inputs which are connected with the clock pulse line 5, the negated output T.2 of the time member T, and with the L output of SR1. Thus, only if the test pulse is correctly inserted into the register stage SR1, will the third input of the AND circuit U4 receive an L signal as well. Then, the AND circuit U4 switches through and, since its output is connected to OR circuit U4, discharges the test pulse at output 11. With this arrangement, it is likewise assured that when a pulse pattern which is to be stored is introduced, the pulse pattern will be available at output 11 without delay even during the storage process (see pulse pattern trains B in FIGS. 7 and 8). This also assures that errors in the input line 6 are not suppressed but are discharged at output 11 and thus remain easily discernible for the control device (not shown) which follows after the memory device.

When the memory device has recognized, in the above-described manner, that a pulse pattern to be stored is being introduced, the time member T also switches through and reverses the output signals at output T.1 and T.2. With this change, the AND circuits U1 and U4 are blocked and AND circuits U3 and U6 are enabled. The erase signal arriving in line 10 after each pulse pattern now no longer reaches the shift register. Storage is effected in the above-described manner as is the discharge via AND circuit U5.

After erasure of the memory device but before running down of time member T, the test pulse is switched through in the above-described manner via AND circuit U6 which assures the emission of the coomplete pulse pattern after time member T has switched during introduction of a pulse pattern to be stored.

To erase the memory device, an erase signal is sent, once or several times, as described in connection with FIG. 3, through line 7 which erase signal is directed, via OR circuit 02 to shift register SR and erases the latter.

Figure 7:
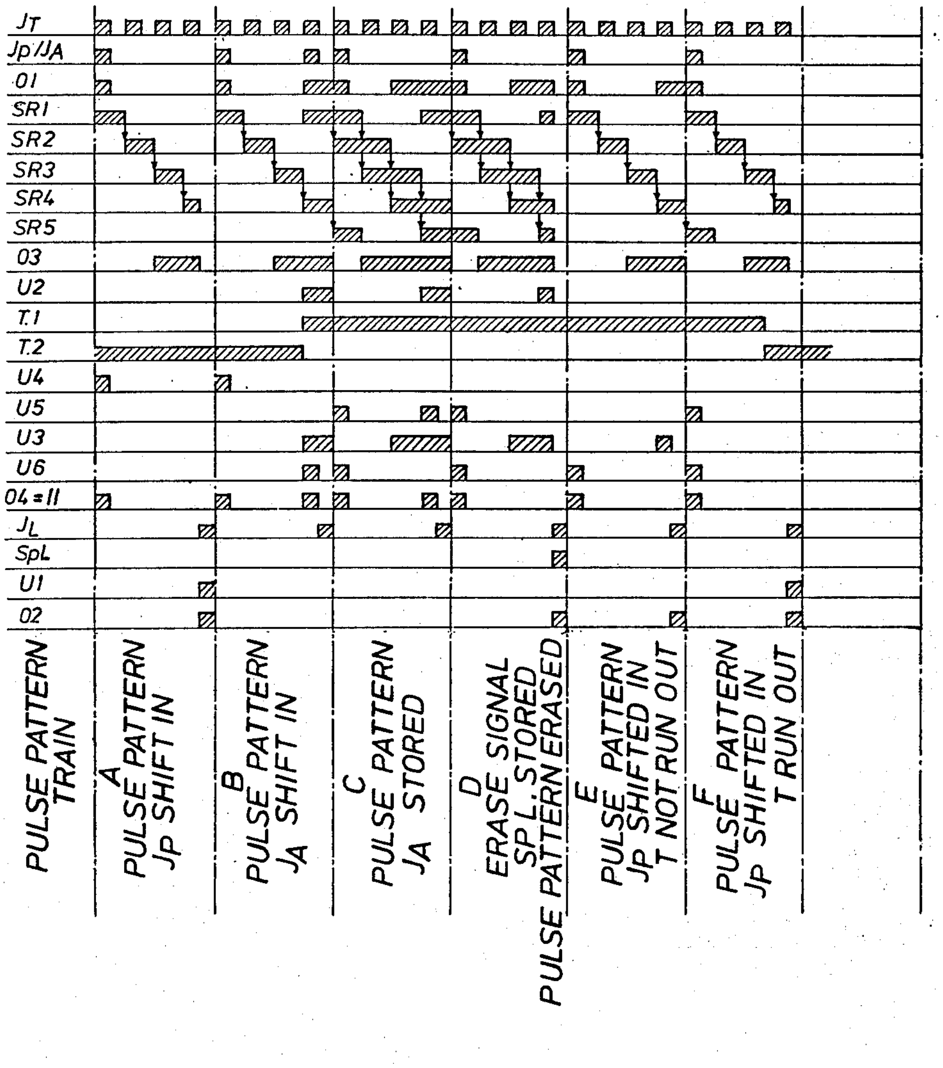
FIGS. 7 and 8 are time diagrams for various memory states and pulse patterns for the circuit of FIG. 4.
Figure 8:
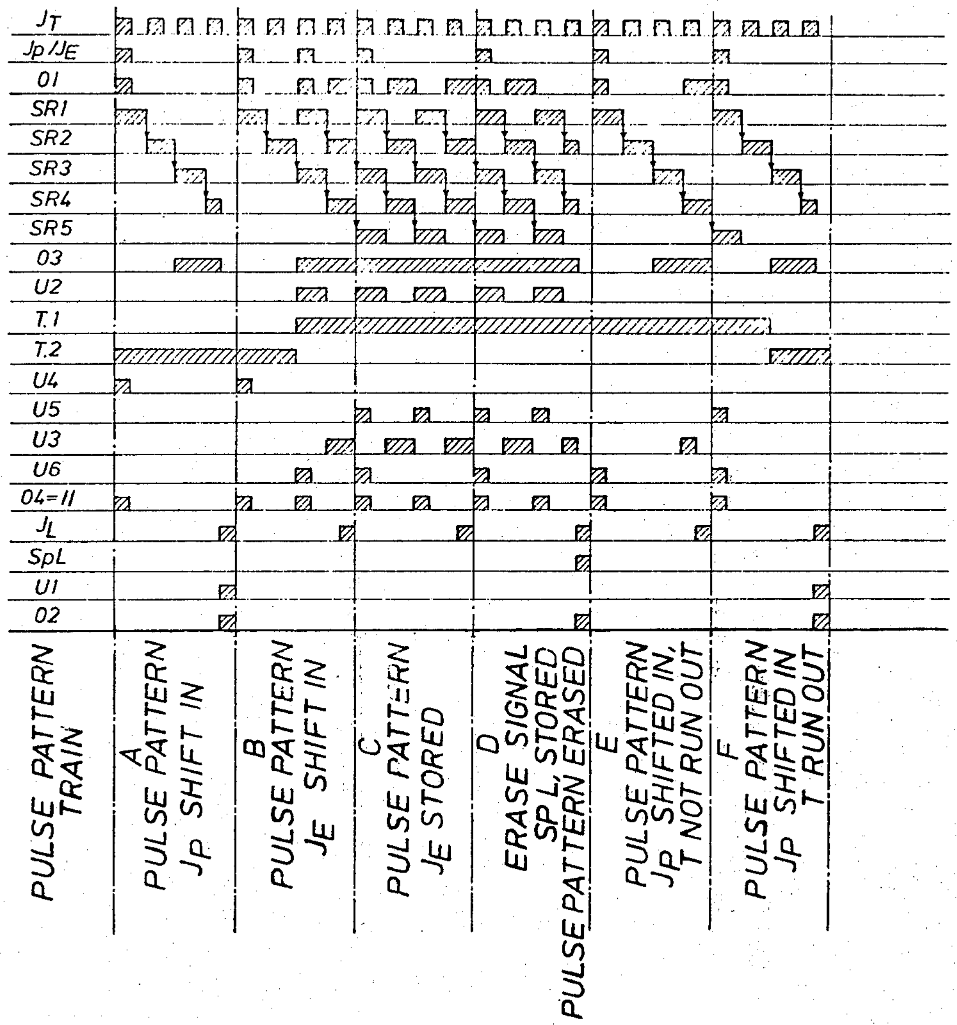

The processes taking place during storing and erasing of the pulse patterns $J_A$ and $J_E$ are illustrated for the arrangement of FIG. 4 in the time diagrams of FIGS. 7 and 8.

Figure 9:
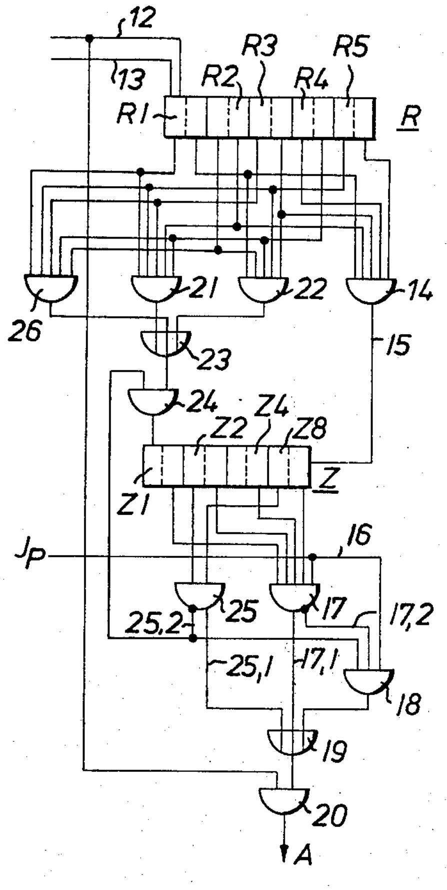
FIG. 9 is a logic circuit diagram of a time delay arrangement for providing a switch-on delay for the pulse patterns.
Figure 10:
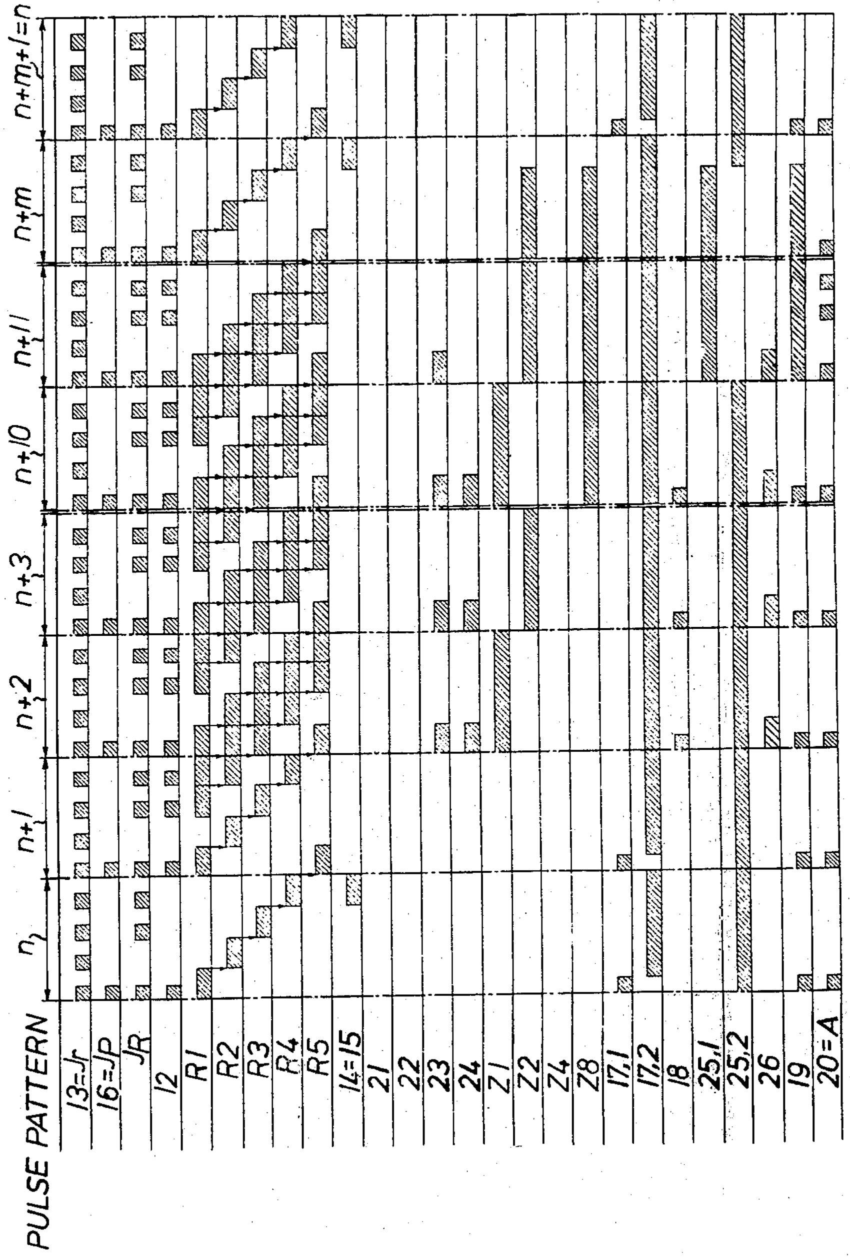
FIG. 10 is the time diagram for the circuit of FIG. 9.

Referring now to FIG. 9 there is shown the circuit for a time or member to be used in conjunction with the memory device of FIGS. 3 or 4 to provide switch-on delay of the stored pulse pattern. FIG. 10 is the associated time diagram.

On signal line 12 pulse pattern train $J_P$ arrives which includes a pulse pattern. With pulse pattern $n+1$, the pulse pattern train $J_R$ is to begin which is to be emitted at output A, for example, after 10 pulse patterns, until the pulse pattern train $J_P$ appears again in line 12.

During the first clock pulse in clock pulse line 13 of pulse pattern $n$, the test signal is put into register stage R1 of the shift register R and during the next three clock pulses it is pushed through to register stage R4. Since now register stages R1–R3 are empty as is register stage R5, the AND circuit 14 which detects this condition will switch through and an erase signal is emitted to a binary counter Z via a line 4.

As long as AND circuit 14 emits a signal, the binary counter Z is erased through line 15. The size of the counter Z depends on the number of pulse patterns which are to pass until the delayed pulse pattern from line 12 is to appear at output A.

Since the test signal pulse pattern $J_P$ from line 16 is continuously present at AND circuits 17 and 18, the AND circuit 17 switches through, if the counter is erased, only at the first clock pulse of each pulse pattern. OR circuit 19 switches in the same rhythm and transfers these signals to the AND circuit 20. Since the second input of this AND circuit 20 is connected with line 12, which during pulse pattern n carries only the test signal pulse pattern $J_P$, the AND circuit 20 switches through also only during the first clock pulse of a pulse pattern and thus emits the test signal pulse pattern $J_P$ at output A.

For pulse pattern $n+1$, for example, the return signal pulse pattern $J_R$, which is to be delayed, is shifted through line 12 into the shift register R and at the end of the pulse pattern it is present in register stages R1–R4. Register stage R5 is empty. During the next clock pulse, the first pulse of pulse pattern $n+2$, the register content is shifted to register stages R2–R5 while in register stage R1 the first signal of pulse pattern $n+2$ is present again. This phase-shifted contents of the shift register is now switched to AND circuits 21 and 22, respectively, whose inputs are connected to the outputs of the register stages R1–R5 so that for an "on" order pulse pattern $J_E$, AND circuit 21 responds and for an "off" order pulse pattern $J_A$ AND circuit 22 responds, i.e., during the first clock pulse of the next following pulse pattern. With the assumed return signal pulse image $J_R$ AND circuit 26, which will more fully be explained below and which directly receives the pulse pattern $J_R$ at one input thereof, will thus also respond during the first clock pulse of the next following pulse pattern.

With this phase shift it is accomplished that the OR circuit 23, which is connected to the outputs of the AND circuits 21 and 22, switches through only at the first clock pulse of a pulse pattern and its output signal enables the AND circuit 24, which then emits a counting signal to counter Z only during the first clock pulse of a pulse pattern and when the negated output 25.2 of AND circuit 25 has a signal indicating AND circuit 25 is not switched through. AND circuit 25 is connected to the output of the counter Z which corresponds to the desired delay; in the present case a count of "10" and consequently is connected to the outputs of stages 22 and 28.

If only the same pulse pattern $J_E$ or $J_A$ or $J_R$ which is to be delayed can arrive in line 12, only one AND circuit with the corresponding input circuit is necessary and OR circuit 23 can be eliminated During the first clock pulse of pulse pattern $n$+1, the test signal is emitted at output A in the same manner as for pulse pattern $n$ since no change was recognized with respect to the switching state of pulse pattern $n$. In correspondence with the problem at hand, no further signal need now appear at output A within pulse pattern $n$+1.

By setting the counter to the value "1", as a result of a counting pulse delivered thereto, the AND circuit 17 is permanently blocked while AND circuit 25 is not yet switched through. The negated outputs 17.2 and 25.2 of AND circuits 17 and 25, respectively, now both carry signals and thus enable AND circuit 18 which now also switches through in the rhythm of the test signal pulse pattern $J_P$ which is also fed to the AND circuit 18. Since AND circuit 25 can switch through only when the counter has reached "10" it is assured that in the meantime, corresponding to the problem to be solved, only the test signal pulse pattern $J_P$ is emitted at output A, without a test pulse being missed by the switching processes.

The same processes now take place during pulse pattern $n$+3 to $n$+9 where AND circuit 14 no longer switches through so that now the counter Z counts on by "1" during each first clock pulse of the pulse pattern.

After ten pulse patterns have passed, i.e., during pulse pattern $n$+11, the counter Z reaches a count of "10" during the first clock pulse thereof. Then AND circuit 25 switches through, and this emits causing the AND circuit 26 to switch through a signal via OR circuit 19 to AND circuit 20 so that the acknowlledgment signal pulse pattern $I_R$ now also appears at output A.

During pulse pattern $n+m$ the test signal pulse pattern $J_P$ should appear again in line 12. As a result, during the fourth clock pulse only register stage R4 is occupied and consequently AND circuit 14 switches through again. Counter Z is then erased through line 15 so that the same state is reinstated as was present during pulse pattern $n$.

At the beginning of pulse pattern $n+m$, since the counter Z is still at a count of "10", switching still takes place via AND circuit 25 and OR circuit 19 and AND circuit 20 during the first clock pulse since the test pulse is also present in line 12. Since no further signal appears in line 12 during the following clock pulses, no further signal can appear at output A. The switching back of the pulse pattern $J_R$ selected in this embodiment to the test signal pulse image $J_P$ thus takes place without delay.

The time diagram corresponding to the various switching states of the circuit of FIG. 9 is illustrated in FIG. 10.

Figure 11:
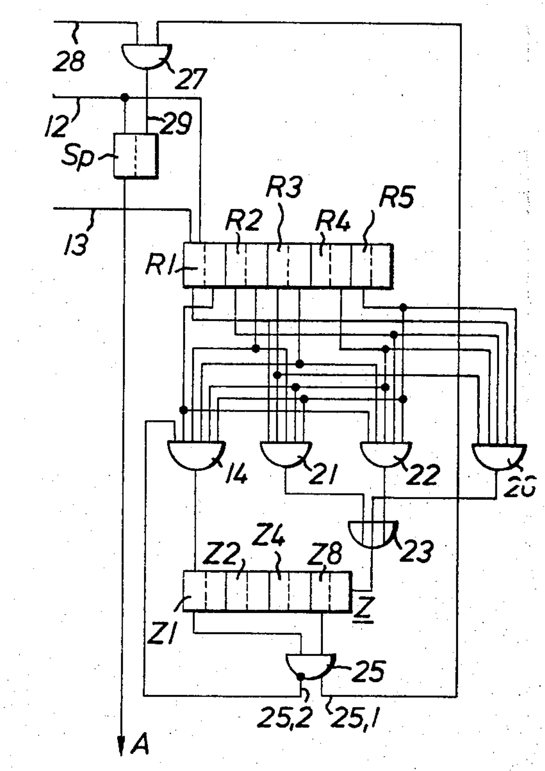
FIG. 11 is a logic circuit diagram of an arrangement for providing a switch-off delay for the pulse patterns.
Figure 12:
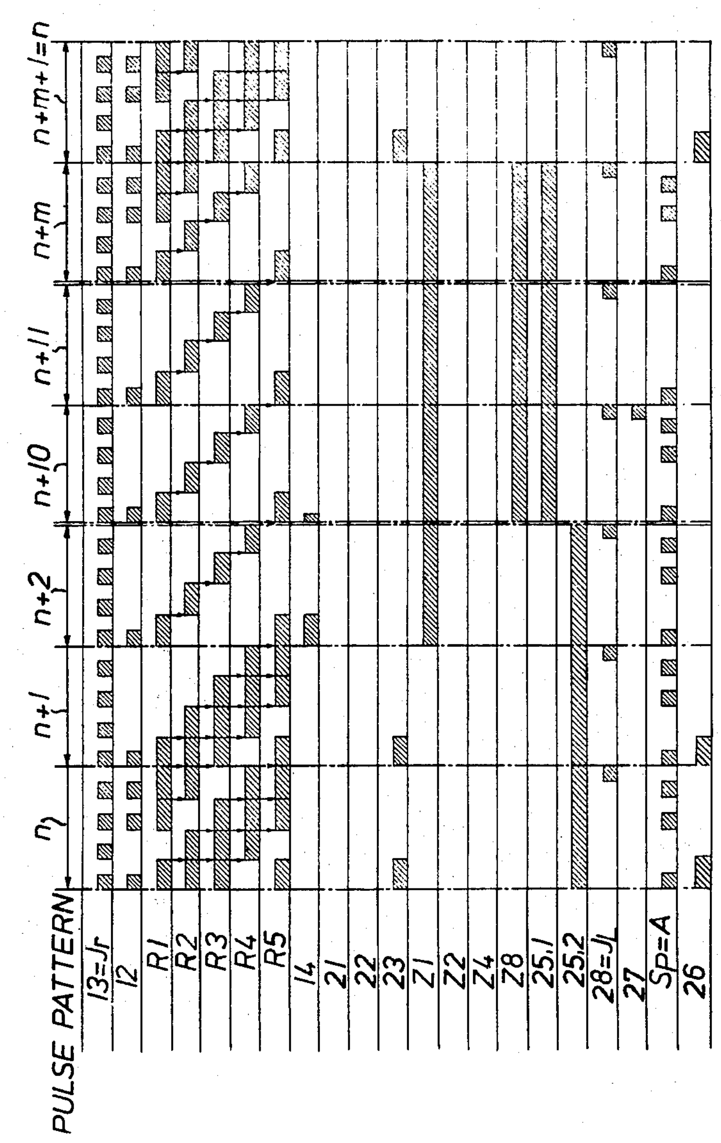
FIG. 12 is a time diagram for the circuit of FIG. 11.

A delay arrangement for the switch-off delay of pulse patterns is shown in FIG. 11 with the corresponding time diagram in FIG. 12. Insofar as the same devices are used as in FIG. 9, they bear the same reference numerals.

The pulse pattern arriving on line 12 is connected with output A only via the memory device of FIGS. 3 or 4, respectively, which hereinafter will be identified as Sp. The delay device is controlled in parallel with the memory devices Sp by the pulse pattern on line 12 and acts only on the erase input 29 of the memory device Sp. The output of the AND members 14 and 23 are connected to counter Z oppositely to the arrangement of FIG. 9, i.e., the output of AND circuit 14 is connected to the input of counter Z and the output of OR circuit 23 is connected to the erase input of counter Z.

In this delay arrangement only the AND circuit 25 is connected to the output of counter Z because the delay device for the switch-off delay acts only on the erase input 29 of the memory device Sp and has no direct influence on the output signal A.

The operation of the device will be explained for the example of the siwtch-off delay with $n = 10$, i.e. during the duration of 10 pulse patterns after the disappearance of the acknowledgement signal pulse pattern $J_R$ (or $J_E$ or $J_A$, respectively) from line 12, the acknowledgement signal pulse pattern $J_R$ must remain at output A.

The acknowledgement signal pulse pattern $J_R$ arrives in line 12 up to pulse image $n$ inclusively. This sets the memory device Sp and it also emits at its output the acknowledgement signal pulse pattern $J_R$, which thus also remains when the test signal pulse pattern $J_P$ arrives again in line 12. During pulse pattern $n$+1 the AND circuit 21 or 22, and OR circuit 23 switch through and again give an erase signal to counter Z because signals of the acknowledgement signal pulse pattern $J_R$ for pulse pattern $n$ are still present in shift register R which will leave the shift register only during the course of pulse pattern $n$+1.

At the beginning of pulse pattern $n$+2 only the test signal pulse pattern $J_P$ of pulse pattern $n$+1 is still in shift register stage R5 while the test signal of pulse pattern $n$+2 is in register stage R1. Thus AND circuit 14 can switch through and set counter Z to "1".

At the beginning of pulse pattern $n$+10 the counter Z is set to "9". Since with the passage of this pulse pattern the switch-off delay is to be terminated, the counting process must now be terminated also. This is done in that the AND circuit 25 detects this condition, i.e., it is connected to the outputs of 21 and 28, and switches through and thus the signal disappears from the negated output 25.2 of AND circuit 25. This causes the AND circuit 14 also to be blocked again so that the setting pulse for the counter Z becomes very short within pulse pattern $n$+10 (see time diagram FIG. 12).

The switching through of AND circuit 25 also enables an AND circuit 27 to whose other input is connected a line 28 on which appears the erase signal $J_L$.

After the fourth clock pulse the erase signal arrives on line 28 which signal now is switched through to the erase input 19 of the memory device Sp and erases it. Thus, the acknowledgement signal pulse pattern $J_R$ disappears at output A and starting with pulse pattern $n+11$ only the test signal pulse pattern $J_P$ is emitted. Counter Z remains at "9" until during pulse image $n+m$ the return signal pulse pattern $J_R$ or the "on" or "off" order pulse pattern $J_E$ or $J_A$, respectively, appears on line 12 and resets the pulse pattern memory Sp.

At the beginning of pulse pattern $n+m+1$ the linkage members 21–23 switch through again and thus erase counter Z so that pulse pattern $n+m+1$ again correspond to pulse pattern $n$.

It will be understood that the above description of the present invention is susceptible to various modifications, changes and adaptations, and the same are intended to be comprehended within the meaning and range of equivalents of the appended claims.

I claim:

1. A memory device for control pulse patterns in automatic switching control systems comprising in combination: A shift register having $n + 1$ register stages, where $n$ is the number of clock pulses per pulse pattern, the input stage of said shift register having a clock input means for receiving a continuous supply of pattern clock pulses, an erase input means for receiving an erase signal and a signal input means, for receiving a working pulse pattern; a first OR circuit having its output connected to said signal input means and a first input connected to a source of working pulse patterns; and logic circuit means connected to said shift register for detecting the presence of a desired working pulse pattern in said register and for causing the storage thereof, said logic circuit means including a timing means responsive to an input pulse for thereafter producing an output pulse for a predetermined time period, first, second, third and fourth AND circuits, and second and third OR circuits; said first AND circuit having a first input connected to the output of said first register stage, a second input connected to the output of said second OR circuit, and its output connected to the input of said timing means; said second OR circuit having at least one input connected to the output of a register stage other than said first register stage; and second AND circuit having a first input connected to the output of said timing means, a second input connected to the output of a penultimate register stage of said shift register, and its output connected to a second input of said first OR circuit; said third AND circuit having a first input connected to the output of the last register stage of said shift register, a second input connected to said clock input means, and its output connected to one input of said third OR circuit; and said fourth AND circuit having a first input connected to the output of said timing means, a second input connected to said first input of said first OR circuit, and its output connected to a second input of said third OR circuit, the output of said third OR circuit constituting the output of said memory device.

2. A memory device as defined in claim 1 wherein, in dependence on the configuration of the working pulse patterns to be stored, the inputs of said second OR circuit are connected to the outputs of selected ones of said register stages so that a signal pattern typical for pulse patterns to be stored is recognized in said shift register at the earliest possible point in time within a single pulse pattern whereby said timing means releases the return line from the output of the $n^{th}$ register stage via said first OR circuit to said signal input means of said input register state to store the pulse pattern.

3. A memory device as defined in claim 2 wherein upon switching on of said timing means T the signal pattern to be stored is emitted at the output of said third OR circuit without delay, complete and in synchronism with the pulse pattern fed into said shift register.

4. A memory device as defined in claim 3 wherein storable and nonstorable pulse patterns are emitted after one pulse pattern length at the correct point in the pulse pattern in the stored form.

5. A memory device as defined in claim 4 wherein each working pulse pattern to be stored is a combination of a standard test pulse pattern and a basic working pulse pattern corresponding to the desired control function, so that when input contacts are switched as a result of operational requirements no test pulse will be lost.

6. A memory device as defined in claim 5 wherein only said test pulse pattern is applied to said signal input means when said working pulse pattern is not present and said test pulse pattern is passed through the memory device for the purpose of continuously monitoring said memory device.

7. A memory device as defined in claim 6 wherein when said memory device is erased by the application of an erase pulse to said erase input means to erase the shift register but said timing means has not as yet ceased producing an output signal, the test pulse fed into said memory device are switched through to the output directly via said fourth AND circuit so that the monitoring remains in effect without interruption.

8. A memory device as defined in claim 7 for an automatic switching control system of the type in which an erase signal is transmitted after each pulse pattern, wherein said logic circuit further includes fifth and sixth AND circuits and a fourth OR circuit, said fifth AND circuit having a first innput connected to a negated output of said timing means, a second input connected to a first erase signal line on which the erase signal which is transmitted after each pulse pattern appears, and its output connected to one input of said fourth circuit, said fourth OR circuit having its other input connected to a second erase input line on which an erase pulse pattern is present when required, and its output connected to said erase input means of said first register stage of said shift register; and said sixth AND circuit having a first input connected to said negated output of said timing means, a second input connected to said output of said first register stage, a third input connected to said clock input means for receiving the continuously present clock pulse pattern and its output connected to a third input of said third OR circuit.

9. A memory device as defined in claim 8 wherein said memory device is erased after every pulse pattern.

10. A memory device as defined in claim 8 wherein upon the detection by said logic circuit means of a pulse pattern to be stored in said shift register and the switching of said timing means, the negated output of said timing means, via said fifth AND circuit blocks the erase pulses arriving on said first erase line until erase pulses on said second erase line erases said memory device.

11. A memory device as defined in claim 1 further comprising means for delaying the working pulse pattern comprising: a shift register means containing one more register stage than the number of clock pulses per pulse pattern and to one input of which a test pulse pattern or a working pulse pattern to be delayed is applied and to another input of which the clock pulses are applied; a binary counter; first logic circuit means having inputs selectively connected to the respective outputs of said stages of said shift register means for providing a counting pulse to said counter upon the detection of one type of pulse pattern in said shift register means and for providing an erase pulse to said counter upon the detection of another type of pulse pattern in said shift register means; and second logic circuit means selectively connected to the respective outputs of the stages of said counter for terminating the delay after a predetermined count of said counter corresponding to a predetermined number of like pulse patterns.

12. A memory device as defined in claim 11 wherein said means for delaying provides a switch-on delay; and wherein said first logic circuit means is responsive to the detection of said test pulse pattern for providing said erase signal for said counter and is responsive to the detection of a working pulse pattern for providing said counting signal for said counter.

13. A memory device as defined in claim 12 wherein said working pulse patterns include an "on" order pulse pattern, an "off" order pulse pattern and an "acknowledgement" pulse pattern which is a composite of said "on" and "off" pulse pattern; wherein said first logic circuit means includes fifth and sixth AND circuits for detecting the presence of said "on" and "off" working pulse paterns respectively in said first register means with a delay of one clock pulse, a fifth OR circuit connected to the outputs of said fifth and sixth AND circuits and having its output connected to one input of a seventh AND circuit whose output is connected to the input of said counter; and wherein said second logic circuit means includes an eighth AND circuit having its inputs selectively connected to the outputs of said counter for detecting said predetermined count in said counter and its output connected to one input of a ninth AND circuit to whose other input is supplied said acknowledgement pulse pattern signal; and eighth AND circuit additionally having a negated output which is connected to a second input of said seventh AND circuit, whereby said counter receives a counting pulse with the first clock pulse of a pulse pattern.

14. A memory device as defined in claim 13 wherein said first logic circuit means includes means for providing an erase signal to said counter when said test pulse pattern is being fed to said shift register on the last clock pulse of said test pulse pattern.

15. A memory device as defined in claim 14 wherein said second logic circuit means includes means for emitting an output signal when said test pulse pattern is being fed to said shift register means only when said counter is erased.

16. A memory device as defined in claim 15 wherein said second logic circuit means further includes a tenth AND circuit having its inputs connected to the stages of said counter for providing an output when said counter is erased; an eleventh AND circuit having its inputs connected to said negated output of said eighth AND circuit, a negated output of said tenth AND circuit and a line supplying said test pulse pattern; the outputs of said ninth, tenth and eleventh AND circuits being coupled via an OR circuit to one input of a twelfth AND circuit, to the other input of which is applied the working pulse and test pulse patterns, and whose output constitutes the output of said delay means, whereby when any of said working pulse patterns is being supplied to the input of said shift register means, said test pulse pattern will be supplied during the delay period only when said eighth and tenth AND circuits have not switched through.

17. A memory device as defined in claim 16 wherein when one of said working pulse patterns is being fed to said shift register means and the delay period has expired, said eighth and ninth AND circuits will switch through and send the acknowledgement signal pulse pattern to said twelfth AND circuit whereby the pulse pattern being fed to said shift register means will be emitted at the output of said twelth AND circuit in synchronism with the clock pulse at the beginning of the pulse pattern following after the delay time.

18. A memory device as defined in claim 17 wherein when the signal being supplied to said shift register means is changed from one of said working pulse patterns to said test pulse pattern, said test pulse pattern appears at said output of said 12 AND circuit without delay and said delaying means is reset during the first pulse of said test pulse pattern.

19. A memory device as defined in claim 11 wherein said means for delaying provides a switch-off delay; wherein the said one input of said shift register means is connected to said signal input means of said shift register of said memory device; and wherein the output of said second logic circuit means, and hence the output of said delay means, is connected to said erase input means of said shift register of said memory device.

20. A memory device as defined in claim 19 wherein said first logic circuit means is responsive to the detection of one of said working pulse patterns in said shift register means for providing an erase pulse to said counter and is responsive to the detection of a test pulse pattern in said shift register means for providing a counting pulse to said counter.

21. A memory device as defined in claim 20 wherein: said second logic circuit means includes a fifth AND circuit having its inputs selectively connected to the outputs of said counter for detecting said predetermined count and its output connected to one input of a sixth AND circuit to whose other input is supplied said erase signal pattern, the output of said sixth AND circuit being connected to said erase input means of said shift register; and said first logic circuit means includes a seventh AND circuit whose inputs are connected to the outputs of the register stages of said shift register means for detecting the presence of said test pulse pattern in said shift register means, and its output connected to the input of said counter, and seventh AND circuit having a further input connected to a negated output of said fifth AND circuit, whereby when said test pulse pattern is being fed to said memory device a counting signal is delivered to said counter at each first clock pulse of the pulse pattern.

22. A memory device as defined in claim 21 wherein said working pulse patterns include an "on" order pulse pattern, an "off" order pulse pattern and an "acknowledgement" pulse pattern which is a composite of said "on" and "off" pulse patterns; wherein said first logic circuit means includes eighth and ninth AND circuits for detecting the presence of said "on" and "off" working pulse patterns respectively in said shift register means with a shift in phase of one clock pulse, a fifth OR circuit connected to the outputs of said eighth and ninth AND circuits and having its output connected to said erase input of said counter whereby when one of said working pulse patterns is being supplied to said memory device, an erase pulse is fed to said counter at the beginning of every first clock pulse of a pulse pattern.

23. A memory device as defined in claim 22 wherein when a delay of $x$ patterns is desired, said fifth AND circuit is connected to said counter so that it will switch through after $x-1$ pulse patterns.

24. A memory device as defined in claim 23 wherein at the first clock pulse of the last pulse pattern to be delayed after said fifth AND circuit has switched through, said input of said counter is blocked and said memory device is enabled for erasure.

25. A memory device as defined in claim 24 wherein after the last clock pulse of the last pulse pattern to be delayed, said memory device is erased.

26. A memory device as defined in claim 25 wherein when said test pulse pattern is supplied to said memory device, said counter remains occupied and said fifth AND circuit remains switched through.

27. A memory device as defined in claim 26 wherein after completion of the first pulse pattern after the pulse pattern supplied to said memory device changes from said test pulse pattern to one of said working pulse patterns, said counter is erased at the beginning of the first clock pulse of the next pulse pattern.

* * * * *